United States Patent [19]
Taylor

[11] Patent Number: 5,821,010
[45] Date of Patent: Oct. 13, 1998

[54] GALVANIC CELL HAVING A RELIABLE SEALABLE VENT CLOSURE

[75] Inventor: Morland J. Taylor, Gainesville, Fla.

[73] Assignee: Eveready Battery Company, Inc., St. Louis, Mo.

[21] Appl. No.: 797,383

[22] Filed: Feb. 7, 1997

[51] Int. Cl.[6] .................................................. H01M 2/08
[52] U.S. Cl. ........................................... 429/172; 429/174
[58] Field of Search ................................. 429/171–174, 429/178, 181, 185

[56] References Cited

U.S. PATENT DOCUMENTS

| | | | |
|---|---|---|---|
| 3,694,267 | 9/1972 | Angelovich | 429/172 X |
| 4,227,701 | 10/1980 | Tsuchida et al. | 429/185 X |
| 4,957,832 | 9/1990 | Ruggeberg et al. | 429/173 X |
| 5,080,985 | 1/1992 | Wiacek et al. | 429/172 |
| 5,272,020 | 12/1993 | Flack | 429/174 X |
| 5,478,669 | 12/1995 | Flack | 429/174 |
| 5,532,081 | 7/1996 | De Palma et al. | 429/171 |

*Primary Examiner*—Anthony Skapars
*Attorney, Agent, or Firm*—Robert W. Welsh; Michael C. Pophal

[57] ABSTRACT

A sealed galvanic dry cell that has a sealing means comprising a terminal cover having a peripheral extending flange that is compressed between a neutral cover and a rim of the open end of a cell's container by use of a compressable gasket that operates such that the rim of the container further interlocks with the flange of the terminal cover upon the buildup of internal pressure to effectively maintain the seal for the cell.

20 Claims, 1 Drawing Sheet

GALVANIC CELL HAVING A RELIABLE SEALABLE VENT CLOSURE

FIELD OF THE INVENTION

This invention relates to a sealed galvanic dry cell, and more particularly to a low pressure sealable vent that maintains its sealing characteristics after a buildup of a permissible range of pressures within the cell.

BACKGROUND OF THE INVENTION

Galvanic cells may generate large quantities of gas under certain conditions during use. Since these cells are required to be tightly sealed at all times in order to prevent loss of electrolyte by leakage, high internal gas pressures may develop. Such pressures may cause leakage, bulging or possible explosion of the cell if not properly vented. If a vent valve is employed, it must maintain its sealing characteristics in order to avoid drying out of the electrolyte over the life of the cell and to prevent ingress of oxygen from the atmosphere which can cause wasteful corrosion of the anode.

In the past, several different types of resealable pressure relief vent valves have been used for releasing high internal gas pressures from inside a sealed galvanic cell. One type of valve that has been commonly used consists basically of a valve member such as a flat rubber gasket which is biased into sealing position over a vent orifice by means of a resilient member such as a helical spring. The resilient member or spring is designed to yield at a certain predetermined internal gas pressure so as to momentarily break the seal and allow the gas to escape through the vent orifice.

Another type of resealable pressure relief vent valve that has been tried is that disclosed and claimed in U.S. Pat. No. 3,293,081. This resealable vent valve basically includes an annular seal gasket such as an O-ring which is maintained in sealing position around the periphery of the vent orifice by means of an arc shaped resilient member or spring. The resilient member or spring is designed to yield and permit radial movement of the seal gasket so as to momentarily break the seal and allow the passage of gas through the vent orifice when a predetermined high internal gas pressure is reached inside the cell.

Another type of resealable vent for dry cells consists of a metal ball overlying a vent opening and biased into sealing engagement around the vent opening by means of a coil spring. The vent opens to release gas from inside the cell when the internal gas pressure reaches a predetermined limit as set by the coil spring. Once the internal gas pressure has been relieved, the coil spring causes the ball to reseat and to reseal the vent.

Another type of resealable vent is disclosed in U.S. Pat. No. 3,415,690. In this vent, a flat elastomeric seal gasket overlies the vent opening and is retained in place by a resilient terminal cap on the top of the cell. This vent operates in basically the same manner as the vents previously described.

In U.S. Pat. No. 3,664,878, a resealable vent is disclosed which comprises a resilient deformable ball of elastomeric material positioned to overlie a vent orifice provided within the cell's container. A retainer means is positioned over the resilient ball for maintaining the ball in place over the vent orifice and in contact with a valve seat provided around the peripheral edge portions of the vent orifice and for compressing and deforming the resilient ball into a flattened configuration forming a normally fluid-tight seal between the flattened ball and the valve seat. The resilient ball is capable of undergoing further temporary deformation upon the buildup of a predetermined high internal gas pressure inside the container so as to momentarily break the seal and allow gas to escape through the vent orifice.

U.S. Pat. No. 4,052,533 disclosed a galvanic dry cell having a resealable subseal comprising a cup-shaped flapper vent valve having an opening at its center for receiving and contacting the cell's current collector rod and a peripheral edge segment contacting and conforming to the inner wall of the cell's container and adapted for deflecting upwardly thereby providing a resealable vent path at the valve-container interface.

U.S. Pat. No. 4,063,902 discloses a galvanic cell, and a method for making it, having a resealable vent closure consisting of a resilient elastomeric sponge gasket disposed and compressed between the cover of the cell and the upper wall of the cell's container and designed such that gas buildup within the cell in the range of about 5 to 75 psi will vent along the cover-gasket interface and/or container-gasket interface.

A major problem encountered with resealable pressure relief vent valves of the types just described is that they are bulky and/or difficult to incorporate into the cell assembly. Furthermore, these pressure relief vent valves are expensive to manufacture.

It is, therefore, an important object of this invention to provide a compact and economical low pressure reliable sealable vent for use in a galvanic dry cell that will maintain its sealing characteristics during a buildup of a permissible range of pressures within the cell.

Still another object of this invention is to provide a reliable sealable vent for galvanic dry cells which requires the very minimum number of parts and which is, therefore, easy to assemble and inexpensive to manufacture.

Another object of this invention is to provide a reliable sealable vent that is adaptable to various diameters of drawn or extruded cell containers.

The foregoing and additional objects will become more fully apparent from the following description and the accompanying drawings.

SUMMARY OF THE INVENTION

The invention relates to an electrochemical cell comprising an anode electrode, a cathode electrode and an electrolyte contained in a container, said container having an open end and a closed end and wherein the open end of the container has a rim segment crimped over and sealed to a seal assembly, said seal assembly comprising a gasket comprising a base member having an upstanding peripheral wall and an upstanding hub defining an opening; a cover having a peripheral segment and a central segment defining an opening, and a terminal cover having a peripheral segment; a current collector rod extending through the opening defined in the hub of the gasket and the opening defined in the cover, said current collector rod extending into the container to contact one of the electrodes of the cell; and wherein the peripheral segment of the terminal cover comprises a base member disposed between an inner upstanding wall and an outer upstanding wall to define a U-shaped contour and said U-shaped contour having an outwardly extending flange such that the base member is superimposed over the peripheral segment of the cover and the flange is superimposed under the rim of the container so that upon the buildup of a predetermined pressure within the cell, the cover will impart a force to the base member of the terminal cover that will further compress the gasket between the flange of the terminal cover and the rim of the container thereby effectively maintaining the seal for the cell.

In the preferred embodiment of the invention, the peripheral flange of the terminal cover could be substantially parallel with the rim of the open end of the container. The base member of the U-shaped contour at the peripheral segment of the terminal cover should preferably be suitably parallel with the top surface of the peripheral segment of the cover. In the preferred embodiment of the invention, the base member could rest on the peripheral segment of the cover so that any pressure buildup within the cell would be directed against the base member via the cover and thereby cause the flange of the terminal cover to be further compressed against the rim of the open end of the container. This novel configuration of the seal assembly permits or causes the terminal cover to further interlock upon an increase in the cell's internal pressure. This unique construction of the seal assembly provides a reliable sealable vent closure that can accommodate low pressure buildup within the cell without leakage of the electrolyte from the cell.

As stated above, cylindrical alkaline cells are generally comprised of a containment means and the components located within the containment means. The containment means comprises an elongated container, that is open on one end, and a vent assembly. The assembly is made up of a terminal cover plate; an elastomeric gasket; and an inner cover. The members of the vent assembly are inserted into the open end of the container thereby sealing the container. The rim portion of the container is then crimped inwardly to form a hermetic seal.

The subject invention is specifically directed to the physical relationship between the shape of the terminal cover's circumferential ring (peripheral segment) and the shape of the container's crimp (rim). The shape of these two components will allow the two parts to interlock as pressure within the cell increases. One embodiment of this invention utilizes (1) a cover with a cross-sectional shape that incorporates a U-shaped contour with one leg of the "U" (flange) turned horizontal to the container's sidewall, and (2) a crimp which positions the inwardly turned rim portion of the container such that the container's rim and terminal cover interlock. The downwardly turned rim of the container is positioned such that there is an overlap between the end of the rim of the container and the bottom cover. Thus, as internal pressure increases, the "U" opens, creating an increase in crimp metal overlap and crimps the rim of the container against the horizontal flange of the cover to interlock the rim to the cover. This increase in overlap is a factor in increasing the pressure required to cause crimp release. Thus the seal of this invention will be secured to prevent premature release of pressure from the cell and sufficient to seal the cell until the pressure is of such magnitude that the cover would be dislodged from the cell. In summary, the basic concept is to configure: (1) the shape of the terminal cover's circumferential edge; and (2) the shape of the circular container's inwardly disposed crimp, so that the crimp and cover interlock upon an increase in the cell's internal pressure. As a result of these components interlocking, the pressure required to cause crimp release is increased relative to cells with a cover and crimp that do not interlock.

The terminal cover's circumferential contour has a cross-sectional shape that resembles a "U" with one leg or flange of the "U" positioned essentially perpendicular to the container's sidewall. The inwardly turned rim of the open end of the container is positioned such that the rim of the container interlocks with the U-shaped portion and flange of the terminal cover upon an increase in the cell's internal pressure. The terminal cover and container are separated by a seal (gasket) which functions as an insulating material.

In the preferable embodiment of the invention, the edge or rim portion of the container is crimped inwardly so that it is superimposed above at least 50% of the horizontal length of the flange of the terminal cover and preferably is superimposed above at least 75% of the horizontal length of the flange of the terminal cover. The base of the U-shaped segment of the terminal cover is superimposed above the peripheral segment of the cover and could be in contact with the peripheral segment of the cover or spaced above the peripheral segment of the cover. It is preferred that the base of the U-shaped segment rest on the peripheral segment of the cover so that a buildup of pressure within the cell will cause the base of the U-shaped segment, via the gasket, to exert a force on the flange of the terminal cover and thereby compress further the gasket between the flange of the terminal cover and the rim of the open end of the container. In this arrangement, the rim of the container and flange of the terminal cover interlock upon the buildup of internal pressure within the cell, thereby effectively maintaining the seal for the cell.

In the preferred embodiment of the invention, the gasket could comprise a U-shaped contour in which the inner wall defines a hub to accommodate the current collector rod and the peripheral wall is designed to be compressed between the cover, terminal cover and rim of the container. The wall defining the hub is designed with a flange and the peripheral wall of the gasket is also designed with a flange which is positioned in alignment with the flange on the inner wall of the gasket. The flanges of the gasket provide a seat for the cover so that the cover could rest on the flanges and remain in position during the sealing of the cell.

The sealing gasket of this invention comprises a material selected with consideration given to its stability in the presence of the electrolyte, its resiliency, and its resistance to cold flow. Suitable polymeric materials are selected from the group consisting of nylon, polytetrafluoroethylene, fluorinated etheylene-propylene, chlorotrifluoroethylene, perfluoro-alkoxy polymer, polyvinyls, polyethylene, polypropylene, polystyrene and the like. Other suitable materials would be recognizable by one skilled in the art. In some applications, additional precautions can be used in conjunction with the gasket of this invention to provide a more effective seal, such as coating the flange of the gasket surfaces with an adhesive agent such as a fatty polyamide resin. The sealing gasket of this invention is amenable to production techniques such as injection molding. The configuration of the surfaces of the gasket flanges is well suited for ease of removal from dies, punches and the like. Preferably the gasket would be nylon. The terminal cover should be made of a conductive material that will not corrode or otherwise deteriorate when in contact with the materials of the cell. The container for the cell could be made of stainless steel, iron, nickel, nickel-plated steel, or some other conductive material.

Commercial conventional cylindrical cells suitable for this invention, should be Leclanche dry cells, are of two main types. In the "pasted" cell, the cathode depolarizer mix is impact or pressure molded to form a cylindrical bobbin containing a current collector rod. This bobbin is later inserted into a cylindrical anode container together with a flowable separator paste or colloidal mass which is cooked or otherwise gelled to form an immobilized separator member between the metal container and the mix bobbin. In the construction of bobbin type cells, a substantial amount of the total cell electrolyte is added by way of the separator paste.

In the "lined" cell, the separator is applied to the inside wall of the metal container either as an adherent film or coating or as an inserted layer of coated paper. The wet cathode mix is extruded or rammed into position to fill a major portion of the lined container and then the current collector rod is inserted directly into the rammed mix or into a hole made by a piercing rod. In this construction, virtually all of the cell electrolyte is added by way of the wet mix.

DESCRIPTION OF THE DRAWINGS

The present invention will become more apparent from the following description thereof when considered together with the accompanying drawings which is set forth as being exemplary of the embodiments of the present invention and is not intended in any way to be limitative thereof and wherein.

Figure 1:
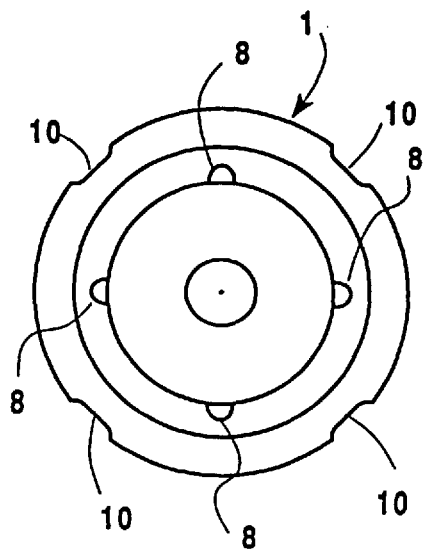
FIG. 1 is a top view of a terminal cover for use in this invention.
Figure 2:
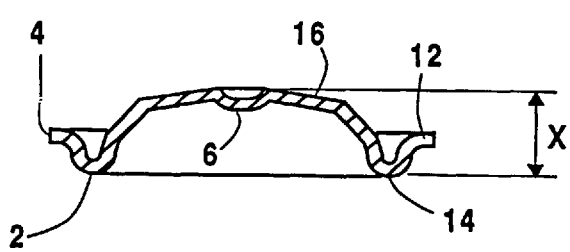
FIG. 2 is a sectional elevation taken through line 2—2 of the terminal cover of FIG. 1.

Referring in detail to FIGS. 1 and 2, there is shown a terminal cover 1 comprising a base member 2 extending with a horizontal peripheral flange 4 and a centrally located dimple 6. Disposed in the terminal cover 1 are four openings 8 for use as vent openings for the cell. Although four vent holes are shown, only one is necessary. Also shown in FIGS. 1 and 2 are four notches 10 which are used for preventing rotation of the cover. Preferably the location of the horizontal flange upper surface 12 should be disposed between 30 to 70% of the height X defined as the distance between the horizontal outer surface 14 of the base 2 and the horizontal plane of the surface 16 defined as the surface between dimple 6 and base 2. Preferably, the location of the horizontal flange upper surface 12 shall be between 45 to 55% of the height X or more preferably about 50% of the height X.

Figure 3:
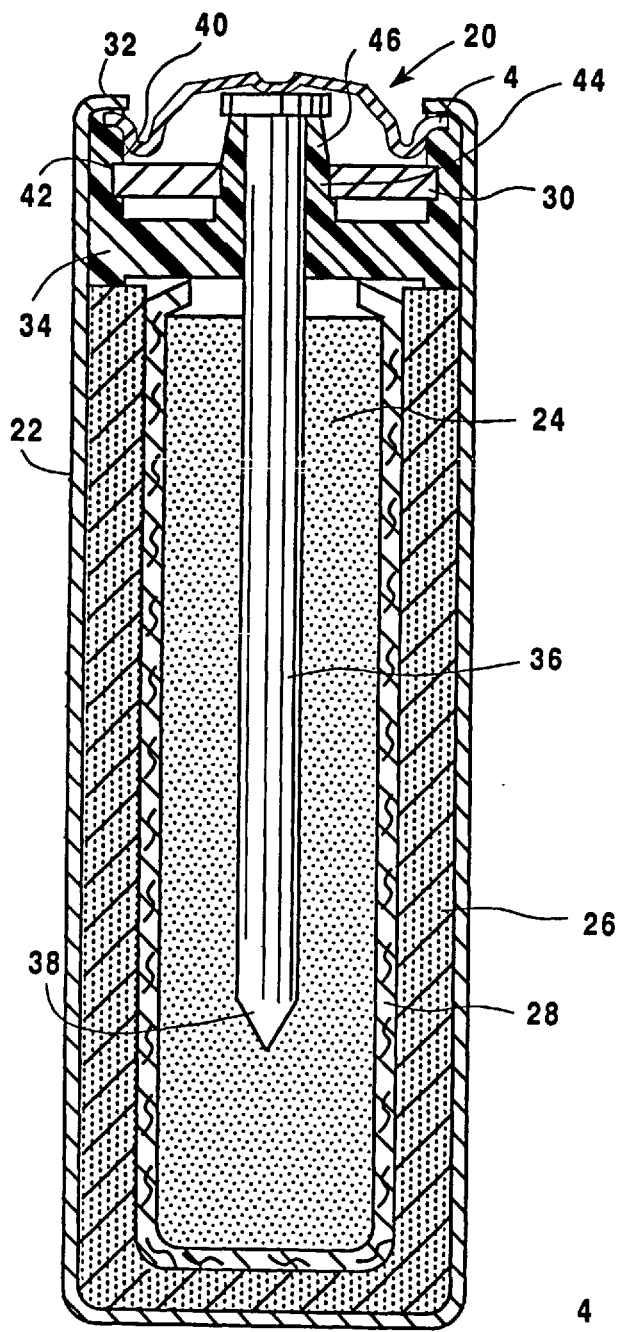
FIG. 3 is a sectional elevation of the closure means of FIG. 1 shown assembled in a galvanic raw cell.

FIG. 3 shows an assembled alkaline manganese dioxide-zinc raw cell 20 comprising container 22 having disposed therein an anode mix 24 and cathode 26 separated by a separator 28. The anode mix 24 could comprise particulated zinc with a gelling agent and an electrolyte, such as aqueous potassium hydroxide. The cathode could comprise manganese dioxide and a conductive material, such as graphite. As shown in FIG. 3 the terminal cover 1 of FIGS. 1 and 3 is positioned within the open end of the container 22 where a cover 30 and flange 4 of terminal cover 1 are compressed against the rim 32 via gasket 34. If desired, a layer of sealant may be disposed at the interface of the seal and the container. Upon inserting seal gasket 34 and cover 30 in container 22, current collector rod 36 having a tapered end 38 is forced into anode mix 24 to make good contact therewith. Once the gasket 34 and cover 30 are seated within container 22, a terminal cover 1 is disposed over the current collector rod 36, the annular edge segment (rim) 32 of container 22 is radially compressed against the cover 30, and the flange 4 of terminal cover 1 via gasket 34 radially sealing the components to the open end of the container 22.

The cover 30 is designed to seat within gasket 34 on flange 40 of peripheral wall 42 and flange 44 of hub member 46 of gasket 34.

It is to be understood that other modifications and changes to the preferred embodiment of the invention herein shown and described can also be made without departing from the spirit and scope of the invention.

I claim:

1. An electrochemical cell comprising an anode electrode, a cathode electrode and an electrolyte contained in a container, said container having an open end and a closed end and wherein the open end of the container has a rim segment crimped over and sealed to a seal assembly, said seal assembly comprising a gasket comprising a base member having an upstanding peripheral wall and an upstanding hub defining an opening; a cover having a peripheral segment and a central segment defining an opening, and a terminal cover having a peripheral segment; a current collector rod extending through the opening defined in the hub of the gasket and the opening defined in the cover, said current collector rod extending into the container to contact one of the electrodes of the cell; and wherein the peripheral segment of the terminal cover comprises a base member disposed between an inner upstanding wall and an outer upstanding wall to define a U-shaped contour and said U-shaped contour having an outwardly extending flange such that the base member is superimposed over the peripheral segment of the cover and the flange member is superimposed under the rim of the container so that upon the buildup of a predetermined pressure within the cell, the cover will impart a force to the base member of the terminal cover that will further compress the gasket between the terminal cover and the rim of the container thereby effectively maintaining the seal for the cell.

2. The electrochemical cell of claim 1 wherein the rim of the container is crimped so that it is disposed substantially in parallel relationship with the flange of the terminal cover and the rim is superimposed over the flange of the terminal cover by at least 50% of the horizontal length of the flange of the terminal cover.

3. The electrochemical cell of claim 1 wherein the rim of the container is crimped so that it is disposed substantially in parallel relationship with the flange of the terminal cover and the rim is superimposed over the flange of the terminal cover by at least 75% of the horizontal length of the flange of the terminal cover.

4. The electrochemical cell of claim 1 wherein the base of the U-shaped segment of the terminal cover is in contact with the peripheral segment of the cover.

5. The electrochemical cell of claim 1 where the base of the U-shaped segment of the terminal cover is spaced apart from the peripheral segment of the cover.

6. The electrochemical cell of claim 5 wherein the space between the base of the U-shaped segment of the terminal cover and the peripheral segment of the cover contains the gasket.

7. The electrochemical cell of claim 4 wherein the rim of the container is crimped so that it is disposed substantially in parallel relationship with the flange of the terminal cover and the rim is superimposed over the flange of the terminal cover by at least 50% of the horizontal length of the flange of the terminal cover.

8. The electrochemical cell of claim 4 wherein the rim of the container is crimped so that it is disposed substantially in parallel relationship with the flange of the terminal cover and the rim is superimposed over the flange of the terminal cover by at least 75% of the horizontal length of the flange of the terminal cover.

9. The electrochemical cell of claim 5 wherein the rim of the container is crimped so that it is disposed substantially in parallel relationship with the flange of the terminal cover and the rim is superimposed over the flange of the terminal cover by at least 50% of the horizontal length of the flange of the terminal cover.

10. The electrochemical cell of claim 5 wherein the rim of the container is crimped so that it is disposed substantially in parallel relationship with the flange of the terminal cover and the rim is superimposed over the flange of the terminal cover by at least 75% of the horizontal length of the flange of the terminal cover.

11. The electrochemical cell of claim 1 wherein the gasket is made of a material selected from the group consisting of nylon, polytetrafluoroethylene, fluorinated etheylene-propylene, chlorotrifluoroethylene, perfluoro-alkoxy polymer, polyvinyls, polyethylene, polypropylene and polystyrene.

12. The electrochemical cell of claim 1 wherein the gasket has spaced apart opposing flanges and the cover seats on these flanges.

13. The electrochemical cell of claim 12 wherein the base of the U-shaped segment of the terminal cover is in contact with the peripheral segment of the cover.

14. The electrochemical cell of claim 12 where the base of the U-shaped segment of the terminal cover is spaced apart from the peripheral segment of the cover.

15. The electrochemical cell of claim 13 wherein the rim of the container is crimped so that it is disposed substantially in parallel relationship with the flange of the terminal cover and the rim is superimposed over the flange of the terminal cover by at least 50% of the horizontal length of the flange of the terminal cover.

16. The electrochemical cell of claim 14 wherein the rim of the container is crimped so that it is disposed substantially in parallel relationship with the flange of the terminal cover and the rim is superimposed over the flange of the terminal cover by at least 50% of the horizontal length of the flange of the terminal cover.

17. The electrochemical cell of claim 15 wherein the rim of the container is crimped so that it is disposed substantially in parallel relationship with the flange of the terminal cover and the rim is superimposed over the flange of the terminal cover by at least 75% of the horizontal length of the flange of the terminal cover.

18. The electrochemical cell of claim 16 wherein the rim of the container is crimped so that it is disposed substantially in parallel relationship with the flange of the terminal cover and the rim is superimposed over the flange of the terminal cover by at least 75% of the horizontal length of the flange of the terminal cover.

19. The electrochemical cell of claim 1 wherein the terminal cover contains at least one vent opening.

20. The electrochemical cell of claim 19 wherein the rim of the container is crimped so that it is disposed substantially in parallel relationship with the flange of the terminal cover and the rim is superimposed over the flange of the terminal cover by at least 50% of the horizontal length of the flange of the terminal cover.

* * * * *